(12) United States Patent
Sundar et al.

(10) Patent No.: US 9,338,099 B2
(45) Date of Patent: *May 10, 2016

(54) DYNAMIC QUEUING AND PINNING TO IMPROVE QUALITY OF SERVICE ON UPLINKS IN A VIRTUALIZED ENVIRONMENT

(71) Applicant: Cisco Technology, Inc., San Jose, CA (US)

(72) Inventors: Nadathur Srinivasan Sundar, Cupertinos, CA (US); Timothy J. Kuik, Lino Lakes, MN (US); Udayakumar Srinivasan, Fremont, CA (US); Behzad R. Dastur, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/099,196

(22) Filed: Dec. 6, 2013

(65) Prior Publication Data

US 2014/0092744 A1    Apr. 3, 2014

Related U.S. Application Data

(63) Continuation of application No. 12/950,124, filed on Nov. 19, 2010, now Pat. No. 8,630,173.

(51) Int. Cl.
*H04L 12/26* (2006.01)
*H04L 12/851* (2013.01)
*H04L 12/701* (2013.01)
(Continued)

(52) U.S. Cl.
CPC ............ *H04L 47/2425* (2013.01); *H04L 45/00* (2013.01); *H04L 45/24* (2013.01); *H04L 47/12* (2013.01); *H04L 47/2408* (2013.01); *H04L 47/76* (2013.01); *H04L 47/805* (2013.01)

(58) Field of Classification Search
None
See application file for complete search history.

(56) References Cited

U.S. PATENT DOCUMENTS 6,480,495 B1 * 11/2002 Mauger ............... H04B 7/18578
  370/316
6,744,767 B1 * 6/2004 Chiu .................... H04L 12/5693
  370/231

(Continued)

OTHER PUBLICATIONS

Office Action in European Application No. 11754779.4, issued Mar. 31, 2015, 6 pages.

(Continued)

*Primary Examiner* — Joseph E Avellino
*Assistant Examiner* — Phyllis A Book
(74) *Attorney, Agent, or Firm* — Edell, Shapiro & Finnan, LLC

(57) ABSTRACT

At a network element having a plurality of physical links configured to communicate traffic over a network to or from the network element, an uplink group is formed comprising the plurality of physical links, wherein the plurality of physical links comprise a first physical link and a second physical link. A plurality of classes of service are defined comprising a first class of service and a second class of service, wherein the first class of service and second class of service have bandwidth allocations on the first physical link. Traffic congestion is detected on the first physical link that exceeds a predetermined threshold for the first class of service. Traffic associated with one or more virtual machines associated with the first class of service on the first physical link is re-associated to the second physical link until the traffic congestion falls below the predetermined threshold.

20 Claims, 10 Drawing Sheets

(51) Int. Cl.
*H04L 12/707* (2013.01)
*H04L 12/801* (2013.01)
*H04L 12/917* (2013.01)
*H04L 12/927* (2013.01)

(56) References Cited

U.S. PATENT DOCUMENTS

| | | | |
|---|---|---|---|
| 6,765,873 B1 * | 7/2004 | Fichou | H04L 12/5695 370/230 |
| 6,822,940 B1 | 11/2004 | Zavalkovsky et al. | |
| 6,920,107 B1 | 7/2005 | Qureshi et al. | |
| 6,952,401 B1 * | 10/2005 | Kadambi | H04L 47/125 370/232 |
| 7,130,267 B1 | 10/2006 | Wendorf et al. | |
| 7,212,494 B1 | 5/2007 | Goldman et | |
| 7,349,704 B2 | 3/2008 | Miernik et al. | |
| 7,450,510 B1 | 11/2008 | Wendorf et al. | |
| 7,606,154 B1 | 10/2009 | Lee | |
| 7,613,184 B2 | 11/2009 | Chiruvolu et al. | |
| 7,680,039 B2 | 3/2010 | Ho et al. | |
| 7,724,668 B2 * | 5/2010 | Bitar | H04L 12/5695 370/235 |
| 7,760,643 B2 | 7/2010 | Kim et al. | |
| 7,778,176 B2 | 8/2010 | Morford | |
| 7,792,104 B2 | 9/2010 | Tzeng | |
| 7,796,510 B2 | 9/2010 | Plamondon | |
| 7,826,352 B2 | 11/2010 | Kwan et al. | |
| 7,876,680 B2 | 1/2011 | Kadambi et al. | |
| 7,924,713 B2 * | 4/2011 | Porat | H04L 12/5695 370/230 |
| 7,974,207 B2 * | 7/2011 | Bitar | H04L 12/5695 370/235 |
| 8,189,597 B2 | 5/2012 | Fan et al. | |
| 2004/0170125 A1 | 9/2004 | O'Neill | |
| 2006/0187826 A1 * | 8/2006 | Chuang | H04L 12/5693 370/229 |
| 2007/0041326 A1 * | 2/2007 | Babiarz | H04L 41/5022 370/237 |
| 2008/0059644 A1 * | 3/2008 | Bakke | H04L 67/2895 709/230 |
| 2008/0225709 A1 | 9/2008 | Lange | |
| 2008/0225712 A1 | 9/2008 | Lange | |
| 2008/0247314 A1 * | 10/2008 | Kim | H04L 12/5695 370/235 |
| 2008/0298236 A1 * | 12/2008 | Ervin | H04L 47/10 370/232 |
| 2009/0089449 A1 * | 4/2009 | Day | H04L 41/145 709/235 |
| 2009/0122707 A1 | 5/2009 | Weinman | |
| 2009/0300209 A1 * | 12/2009 | Elzur | H04L 47/10 709/234 |
| 2010/0054129 A1 | 3/2010 | Kuik et al. | |
| 2010/0146503 A1 * | 6/2010 | Tsai | G06F 9/4881 718/1 |
| 2010/0195530 A1 * | 8/2010 | Bitar | H04L 12/5695 370/252 |
| 2010/0271946 A1 | 10/2010 | Davari et al. | |
| 2010/0290473 A1 | 11/2010 | Enduri et al. | |
| 2011/0002222 A1 | 1/2011 | Kwan et al. | |
| 2011/0019552 A1 * | 1/2011 | Karaoguz | H04L 45/00 370/236 |
| 2011/0026398 A1 | 2/2011 | Natarajan et al. | |

OTHER PUBLICATIONS

International Search Report and Written Opinion in International Application No. PCT/US2011/048182, mailed Feb. 22, 2012.
Partial International Search report in International Application No. PCT/US2011/048182, mailed Dec. 23, 2011.
Office Action in European Application No. 11754779.4, issued Jul. 21, 2014, 7 pages.

* cited by examiner

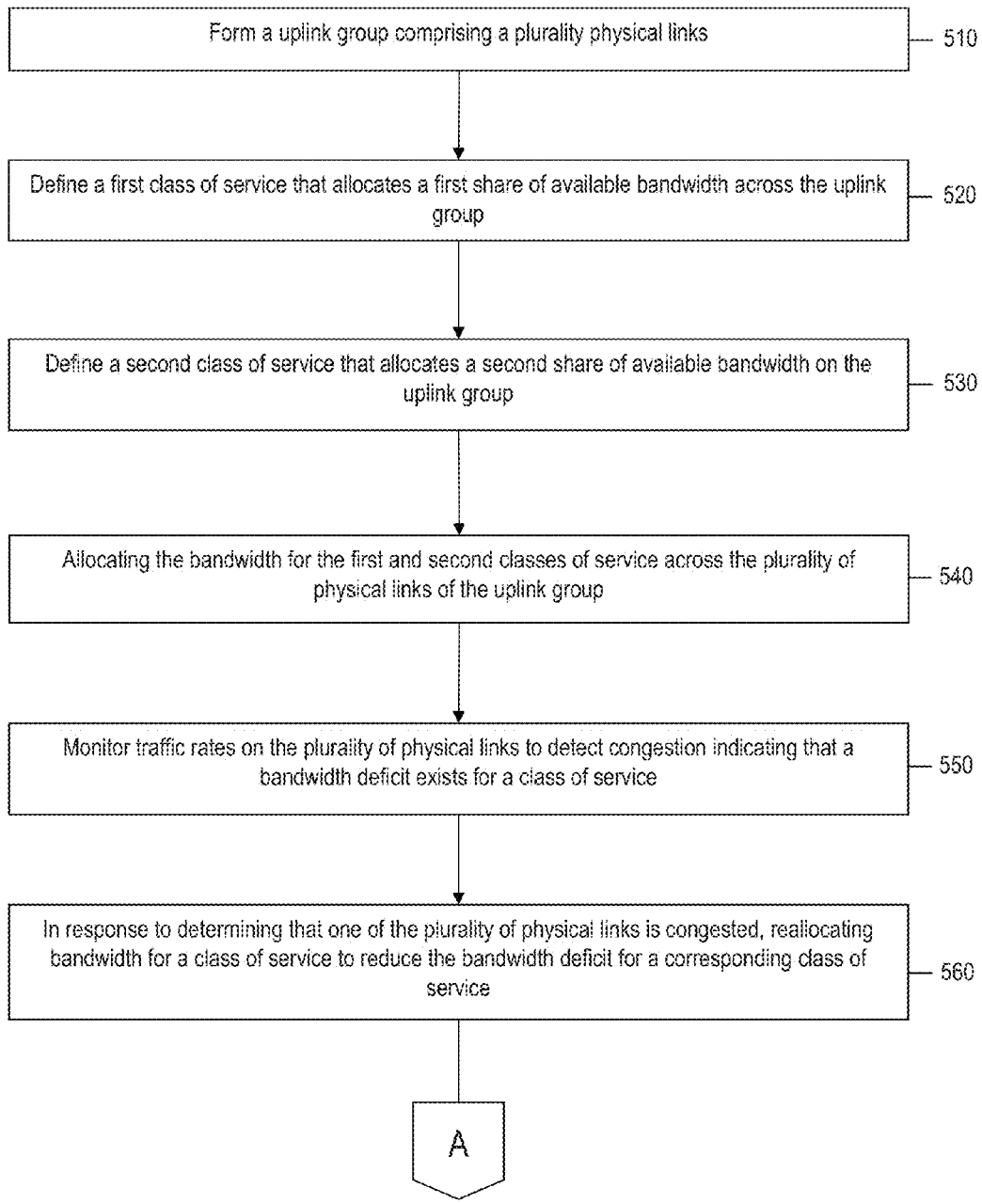

Reallocate bandwidth by transferring a service flow associated with a class of service with a bandwidth deficit from one physical link to another physical link — 585

Process logic 1000 allocates new VMs across members of class 2

DYNAMIC QUEUING AND PINNING TO IMPROVE QUALITY OF SERVICE ON UPLINKS IN A VIRTUALIZED ENVIRONMENT

CROSS REFERENCE TO RELATED APPLICATIONS

This application is a continuation of U.S. patent application Ser. No. 12/950,124, filed Nov. 19, 2010, entitled "Dynamic Queuing and Pinning to Improve Quality of Service on Uplink in a Virtualized Environment," the entire contents of which are hereby incorporated by reference.

TECHNICAL FIELD

The present disclosure generally relates to Quality of Service (QoS) queuing and more particularly to dynamically allocating bandwidth to better utilize traffic classes in a virtualized computing and networking environment.

BACKGROUND

QoS queuing allows a network administrator to allocate bandwidth based on a QoS traffic class. In a virtualized environment, virtual machine (VM) interfaces are set up to handle VM traffic over the network. Even though the environment is "virtual", the traffic sent outside of the host or server must still travel over a physical link. A traffic class may be allocated a portion of the available bandwidth on one or more physical links, e.g., traffic class X may be allocated 40% of available bandwidth on physical link 1 and 60% of available bandwidth on physical link 2. Other traffic classes may be similarly allocated. Assuming that there are two physical links of equal capacity then traffic class X is allocated 50% of the overall available bandwidth.

When two (or more) physical links are configured with the same network connectivity (e.g. VLANs) and queuing policy, each can be used to carry the server traffic. The two (or more) physical links may be logically combined to form an uplink group, port channel (PC), or port group. PCs and port groups are examples of an uplink group. Each of the physical links may be referred to as a member or member of the uplink group or PC. There may be more than one such group of physical links within a host. A VM interface may be tied (pinned) to a specific physical link with the group or its traffic may be distributed among multiple members of the group, i.e., in some implementations the VM interfaces are not pinned to specific physical links.

BRIEF DESCRIPTION OF THE DRAWINGS

FIG. 5 is an example of a flowchart generally depicting a process for reallocating traffic share.

DESCRIPTION OF EXAMPLE EMBODIMENTS

Overview

Techniques are provided for improving quality of service on uplinks in a virtualized environment. At a network element having a plurality of physical links configured to communicate traffic over a network to or from the network element, an uplink group is formed comprising the plurality of physical links, wherein the plurality of physical links comprise a first physical link and a second physical link. A plurality of classes of service are defined comprising a first class of service and a second class of service, wherein the first class of service and second class of service have bandwidth allocations on the first physical link. Traffic congestion is detected on the first physical link that exceeds a predetermined threshold for the first class of service. Outbound traffic associated with the first class of service on the first physical link is paused. Traffic associated with one or more virtual machines associated with the first class of service on the first physical link is re-associated to the second physical link until the traffic congestion falls below the predetermined threshold.

Techniques are also provided for assigning new VMs to a member according to QoS hashing results. For each member of an uplink group comprising a plurality of physical links at a network element, a current number of class of service users is tracked by corresponding class. A request is received at a virtual machine (VM) interface of the network element wherein the VM is a class of service user associated with a particular class of service. A determination is made as to which member of the uplink group associated with the particular class of service has the minimum number of class of service users for the particular class of service. The VM is associated with a first member of the uplink group with the minimum number of class of service users for the particular class of service in order to ensure that the number of class of service users of each member of the uplink group are allocated evenly.

Example Embodiments

Figure 1:
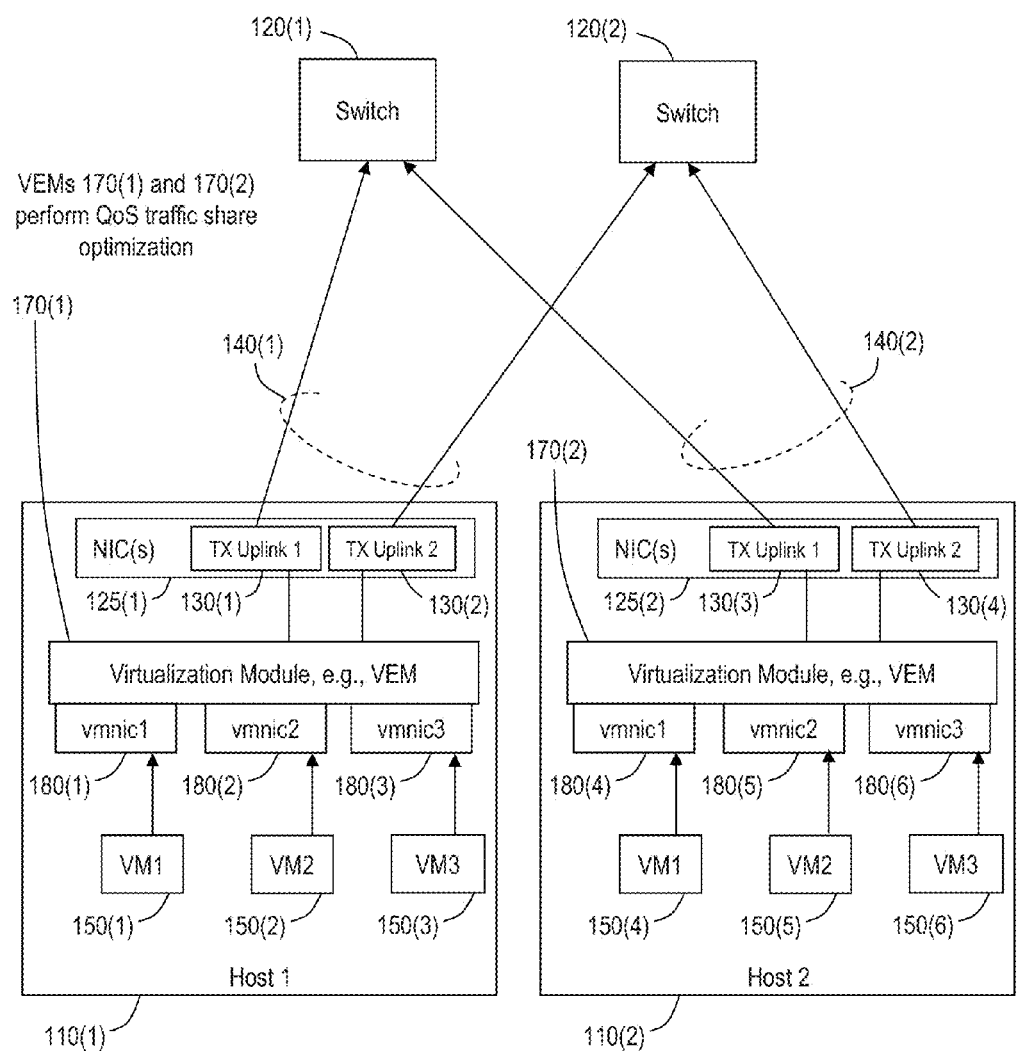
FIG. 1 is an example of a block diagram of the relevant portions of a network with host devices that are configured to optimize traffic shared among members of an uplink group according to the techniques described herein.

Referring first to FIG. 1, an example system 100 is shown that depicts relevant portions of a larger network. System 100 comprises servers or host devices, e.g., Host 1 at reference numeral 110(1) and Host 2 at reference numeral 110(2), and switches 120(1) and 120(2). Hosts 110(1) and 110(2) communicate upstream to switches 120(1) and 120(2) via network interface card(s) (NIC(s)) 125(1) and 125(2). NICs 125(1) and 125(2) have at least two physical transmit (TX) uplinks 130(1)-130(2), and 130(3)-130(4), respectively. The TX uplinks each comprise transmitters for transmitting traffic to the switches and may be referred to herein simply as uplinks. In this example, Uplink1 130(1) and Uplink2 130(2) from host 110(1) form uplink group 140(1), while Uplink1 130(3) and Uplink2 130(4) from host 110(2) form uplink group 140(2). The logical nature of uplink groups 140(1) and 140(2) is indicated by the dashed rings around the uplink traffic arrows. The hosts 110(1) and 110(2) are physical server computing devices.

Each of the hosts 110(1) and 110(2) may have one or more VMs running. As shown, host 110(1) has VM1 150(1), VM2 150(2), and VM3 150(3) and host 110(2) has VM1 150(4), VM2 150(5), and VM3 150(6). The VMs run on hardware abstraction layers commonly known as hypervisors that provide operating system independence for the applications served by the VMs for the end users. Any of the VMs 150(1)-150(6) are capable of migrating from one physical host to another physical host in a relatively seamless manner using a process called VM migration, e.g., VM 150(1) may migrate from host 110(1) to another physical host without interruption.

The VM interfaces to the uplinks 130(1)-130(4) for the VMs are managed by virtualization modules 170(1) and 170(2), respectively. In one example, the virtualization module may be a software based Virtual Ethernet Module (VEM) which runs in conjunction with the hypervisor to provide VM services, e.g., switching operations, QoS functions as described herein, as well as security and monitoring functions. Each of the VMs 150(1)-150(6) communicate by way of a virtual (machine) network interface cards (vmnics). In this example, VMs 150(1)-150(4) communicate via vmnics 180(1)-180(6). Although only three VMs are shown per host, any number of VMs may be employed until system constraints are reached.

System 100 illustrates, in simple form, an architecture that allows for ease of description with respect to the techniques provided herein. FIG. 1 shows two hosts 110(1) and 110(2), two switches 120(1) and 120(2), and two uplinks per switch 130(1) and 130(2), and 130(3) and 130(4), respectively, thereby forming a completely binary example. FIG. 1 shows that traffic from uplinks 1, i.e., uplinks 130(1) and 130(3), is sent to switch 120(1), and traffic from uplinks 2, i.e., uplinks 130(2) and 130(4), is sent to switch 120(2). This configuration illustrates that uplink redundancy may be provided by two hosts 110(1) and 110(2), and two switches 120(1) and 120(2). The example shown in FIG. 1 could easily be implemented via a single host and a single switch, or any number of hosts and switches.

The hosts 110(1) and 110(2) may have more than two physical uplinks, each of which may be part of a plurality of bidirectional network interfaces, cards, or units, e.g., NICs 125(1) and 125(2), and each of the physical links need not have the same bandwidth capacity, i.e., some links may be able to carry more traffic than other links, even when combined within the same uplink group. Some implementations, e.g., when the uplink groups are PCs, find it advantageous for the physical uplinks to have the same bandwidth capacity. Although the techniques described herein are made with reference to uplinks, the QoS traffic optimization techniques described herein may also be used on downlink communications. In addition, switches 120(1) and 120(2) may comprise any other type of network element, e.g., routers.

The physical links may become congested due to the bursty or variable nature of data exchanged between users, applications, and storage facilities. For example, if two users with the same class of service are assigned to the same physical link by way of their associated VMs, and the two users are engaged in high data rate operations, then the associated physical link may become congested, thereby restricting or choking the intended bandwidth for a given class of service. The congestion may result in a contracted service provider not meeting the contracted level of service/QoS, e.g., according to a service level agreement (SLA). This may result in unwanted discounts or other remunerations to the customer. In addition, non-VM traffic is also supported via the same physical uplinks 130(1)-130(4). For example, the uplink may need to support traffic for Internet Small Computer System Interface (iSCSI) communications, Network File System (NFS) operations, Fault Tolerance, VM migration, and other management functions. These additional traffic types may each share or have their own class of service and may operate using virtual network interfaces other than vmnics, e.g., by way of a virtual machine kernel interfaces (vmks). Some traffic classes distribute better over multiple uplinks than others. The techniques described herein are operable regardless of the type of virtual network interface, e.g., vmnics, vmks, or other network interfaces.

The techniques described herein provide a way to mitigate potential service provider income losses (and/or customer performance bonuses) by allowing QoS based traffic reallocation mechanisms or new VM interface allocations to be optimized or otherwise improved, i.e., virtualization modules 170(1) and 170(2), or other hardware and software components of hosts 110(1) and 110(2) may perform QoS traffic share optimization as indicated in FIG. 1. These processes are further described in connection with the remaining figures.

Figure 2:
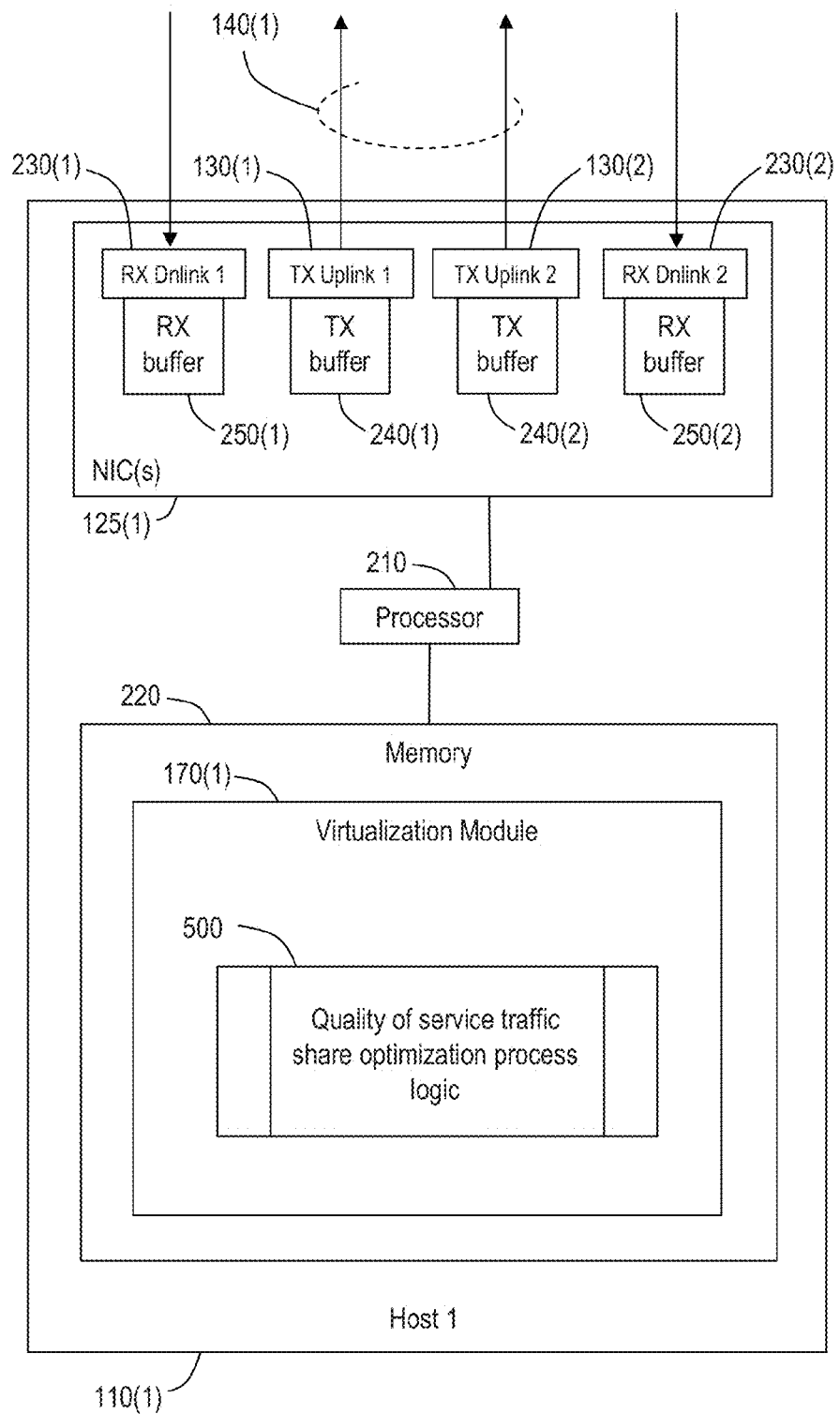
FIG. 2 is an example of a block diagram of a host device with a virtualization module that is configured to optimize traffic share among members of an uplink group according to the techniques described herein.

Referring to FIG. 2, an example block diagram of a host device, e.g., host 110(1), is shown. The host device 110(1) comprises a data processing device 210, one or more NICs 125(1), a plurality of network TX uplinks 130(1) and 130(2), RX downlinks 230(1) and 230(2), and a memory 220. Other hardware software or hardware logic may be employed. The uplinks 130(1) and 130(2), and downlinks 230(1) and 230(2) may be subcomponents of NICs 125(1) that provide bidirectional communication among a plurality of network devices. Each of the uplinks and downlinks have associated TX buffers 240(1) and 240(2), and RX buffers 250(1) and 250(2), respectively, for the buffering of transmit and receive data, and may comprise other tangible (non-transitory) memory media for other NIC operations. Resident in the memory 220 is a virtualization module 170(1) that incorporates software for a QoS traffic share optimization process logic 500. Process logic 500 may also be implemented in hardware or be implemented in a combination of both hardware and software.

The data processing device 210 is, for example, a microprocessor, a microcontroller, systems on a chip (SOCs), or other fixed or programmable logic. The data processing device 210 is also referred to herein simply as a processor. The memory 220 may be any form of random access memory (RAM), FLASH memory, disk storage, or other tangible (non-transitory) memory media that stores data used for the techniques described herein. The memory 220 may be separate or part of the processor 210. Instructions for performing the process logic 500 may be stored in the memory 220 for execution by the processor 210 such that when executed by the processor, causes the processor to perform the operations describe herein in connection with FIGS. 5, 6, 8 and 10.

Process logic 500 may be stored on other non-transitory memory such as forms of read only memory (ROM), erasable/programmable or not, or other non-volatile memory (NVM), e.g., boot memory for host 110(1). The NICs 125(1) and uplinks 130(1) and 130(2) enable communications between host 110(1) and other network endpoints. It should be understood that any of the devices in system 100 may be configured with a similar hardware or software configuration as host 110(1).

The functions of the processor 210 may be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 220 stores data used for the computations or functions described herein (and/or to store software or processor instructions that are executed to carry out the computations or functions described herein). Thus, functions of the process logic 500 may be implemented with fixed logic or programmable logic (e.g., software or computer instructions executed by a processor or field programmable gate array (FPGA)). The process logic 500 executed by a host, e.g. host 110(1), has been generally described above and will be further described in connection with FIGS. 4-6, and further specifics example embodiments will be described in connection with FIGS. 7 and 8.

Figure 3:
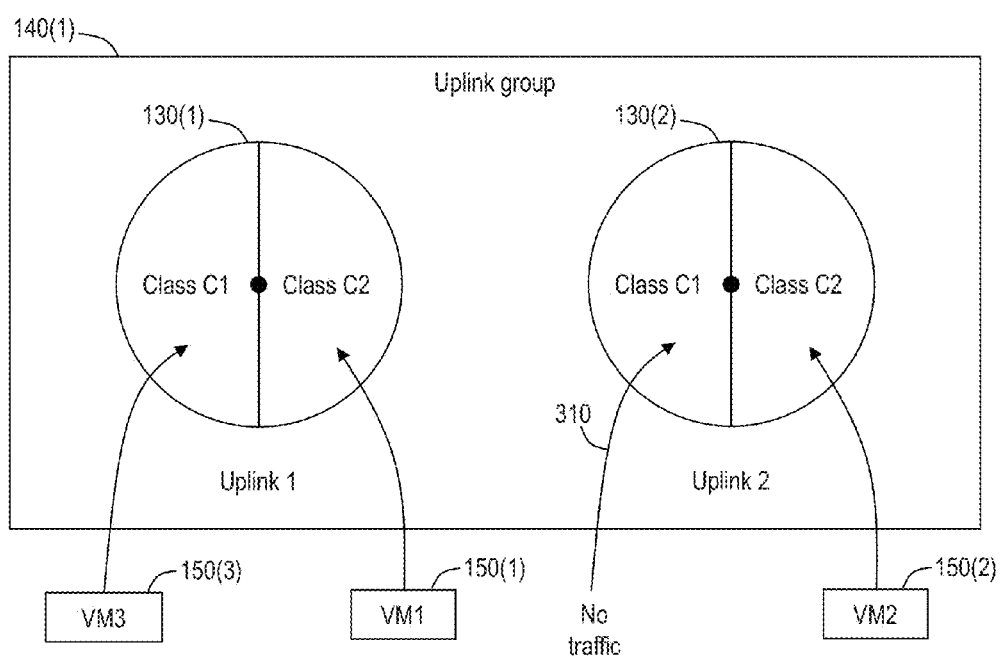
FIG. 3 is an example of a pie chart diagram depicting bandwidth allocation for an uplink group.

Turning now to FIG. 3, an example of a diagram depicting bandwidth allocation for an uplink group, e.g., uplink group 140(1), will now be described. In this example, physical uplinks 130(1) and 130(2) are allocated bandwidth according to two classes of service, class C1 and class C2. In this example, classes C1 and C2 are administratively allocated equally to physical uplinks 130(1) and 130(2), i.e., classes C1 and C2 are assigned 50% bandwidth on each of the uplinks 130(1) and 130(2). VM 150(3) is class C1 traffic and is assigned or Media Access Control (MAC) pinned to a member of class C1 on uplink 130(1) as shown, VM 150(1) is class C2 traffic and is pinned to class C2 on uplink 130(1), VM 150(2) is class C2 traffic and is pinned to class C2 on uplink 130(2), and no traffic has been assigned to class C1 on uplink 130(2).

Figure 4A:
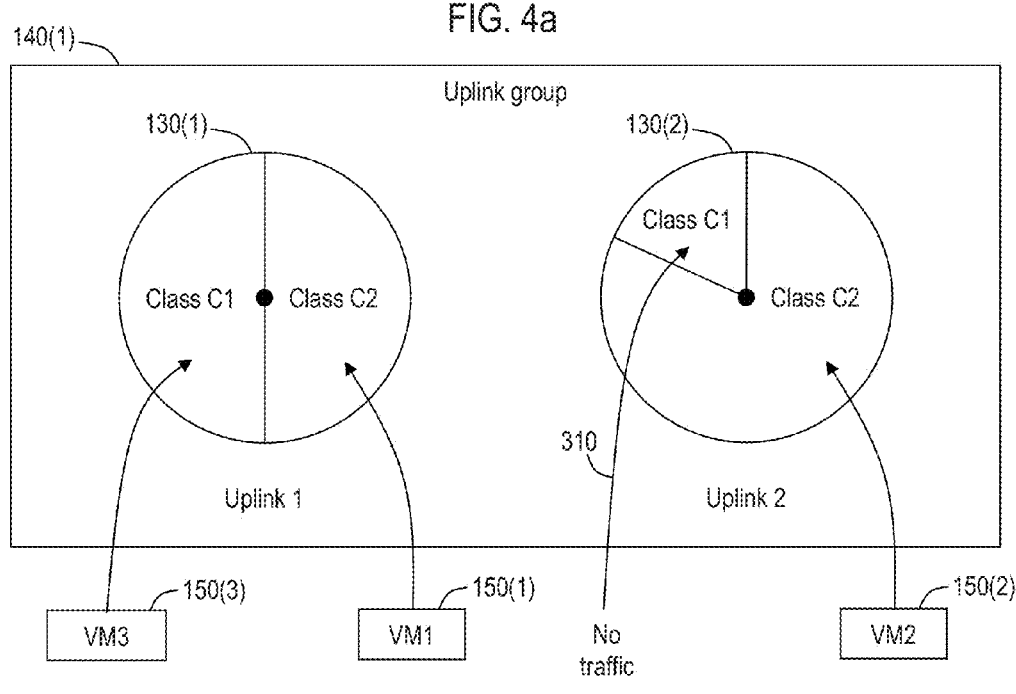
FIG. 4a is an example of a pie chart diagram depicting bandwidth utilization for an uplink group.

Referring to FIG. 4a, an example of a diagram depicting bandwidth utilization for an uplink group 140(1) is shown. Uplink group 140(1) is shown after a period of time. Since no class C1 traffic has been assigned to uplink 130(2), VM 150 (2) is able to "over utilize" the bandwidth available on uplink 130(2). At this point in time, VM 150(2) is using approximately 80% of the available bandwidth on uplink 130(2). At any given moment in time, the class distribution and/or class traffic may become lopsided due to heavier usage by some VMs, or some traffic is not distributed over all the members of the class. Both of theses problems can lead to one or more members becoming congested while other members are under utilized. Consequently, any given class may not get their "fair share" of the allocated bandwidth class portions that are programmed into each member of the uplink group. In this example, process logic 500 detects that there is congestion on uplink 130(1) and that class C1 is not receiving a fair 50% share of its QoS bandwidth across the members of uplink group 140(1).

Process logic 500 computes the bandwidth deficits and surpluses for each class of service C1 and C2. Class C1 has 50% of the available bandwidth on uplink 130(1) and 0% of the available bandwidth on uplink 130(2). Accordingly, class C1 has an overall bandwidth deficit of 50%. Class C2 has 50% of the available bandwidth on uplink 130(1) and 80% of the available bandwidth on uplink 130(2). Accordingly, class C2 has an overall bandwidth surplus of 30%.

Figure 4B:
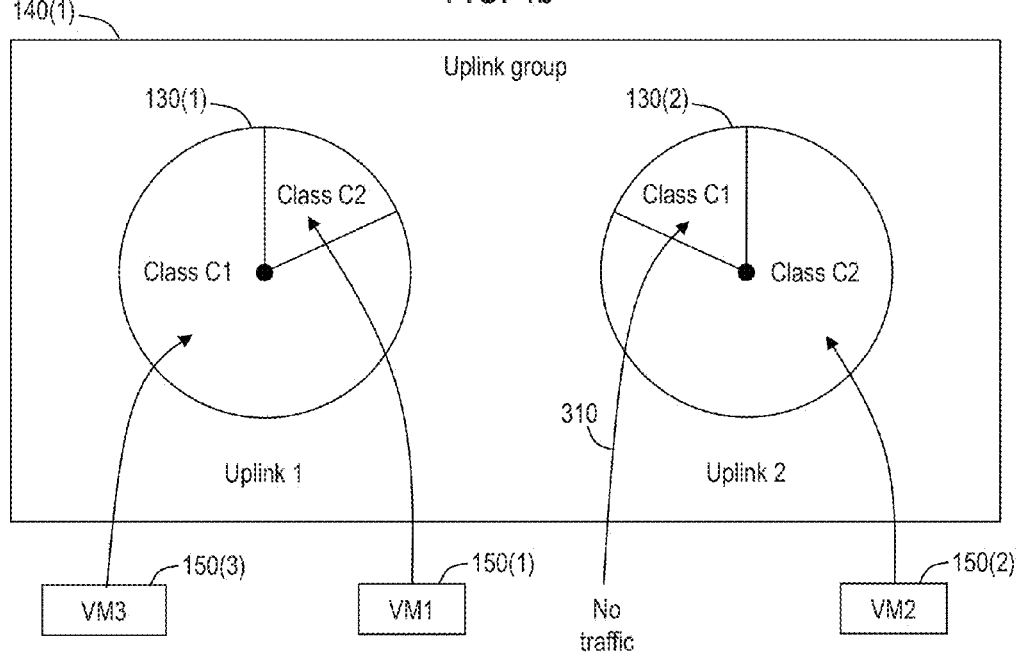
FIG. 4b is an example of a pie chart diagram depicting bandwidth reallocation for the uplink group of FIG. 4a after traffic share has been optimized among the members of the uplink group according to a first example.

Referring to FIG. 4b, as a result of the class deficit and surplus calculations, process logic 500 reallocates bandwidth to align actual bandwidth utilization with QoS goals or SLAs. Process logic 500 reallocates class C1 to have an 80% share of the available bandwidth on uplink 130(1). As a result, the class C1 deficit has been reduced from 50% to 20% and the surplus from class C2 has been eliminated. Generally, surplus bandwidth elimination is not a consideration for QoS performance. Thus, process logic 500 configures bandwidth utilization to more closely match overall QoS goals. Process logic 500 may also direct VM traffic to be distributed differently over the various uplinks when the VMs are not pinned to a specific uplink.

Referring now to FIG. 5, an example of a flowchart is shown that generally depicts the operations of the QoS traffic share optimization process logic 500 that dynamically reallocates traffic shares to align current traffic load with QoS policy. Operations 510-540 are preliminary operations performed in the course of setting up an uplink group, e.g., uplink group 140(1), and are not necessarily germane to the techniques described herein. At 510, at a server apparatus, e.g. a host device, having a plurality of physical links (e.g., at least first and second physical links) configured to communicate traffic over a network to or from the server apparatus, an uplink group is formed comprising the plurality of physical links. At 520, a first class of service is defined that allocates a first share of available bandwidth across the uplink group. At 530, a second class of service is defined that allocates a second share of available bandwidth across the uplink group. At 540, the bandwidth for each of the classes of service is allocated across the plurality of physical links of the uplink group.

At 550, traffic rates are monitored on the plurality (e.g., first and second) physical links to detect congestion indicating that a bandwidth deficit exists for a class of service. At 560, in response to determining that one of the plurality of physical links is congested, bandwidth for a class of service is reallocated to reduce the bandwidth deficit for a corresponding class of service when a bandwidth deficit exists for the corresponding class of service. Accordingly, if it is determined that a physical link is not congested, then the bandwidth may be reset to initial bandwidth allocations or reallocated to more closely match initial bandwidth allocations.

Although only two classes of service have been described with respect to the examples provided herein, it should be understood that any number of traffic classes may be defined for a system and the QoS traffic share optimization process logic 500 operates on any number of traffic classes. Process logic 500 may reallocate bandwidth for three or more classes of service or over three or more physical links. For example, one or more additional classes of service are defined that allocate shares of available bandwidth on the uplink group and the bandwidth for each of the additional classes of service is allocated across the plurality of physical links of the uplink group. Process logic 500 may reallocate bandwidth in any manner among all the classes of service in order to reduce bandwidth deficits. The flowchart for the QoS traffic share optimization process logic 500 continues in FIG. 6 according to a first example.

Figure 6:
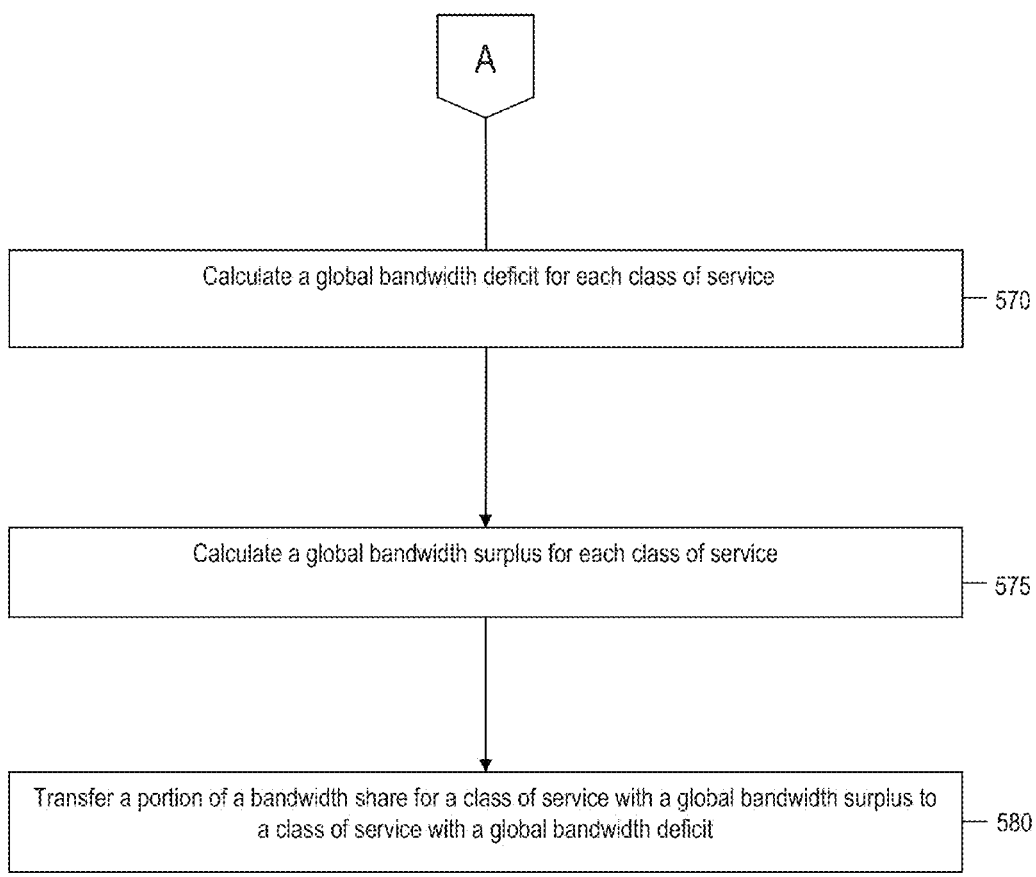
FIG. 6 is an example of a flowchart depicting a continuation of the process from FIG. 5 for reallocating traffic share according to the first example.

Turning to FIG. 6, at 570, a global bandwidth deficit (across all members of the uplink group) is calculated for each class of service. At 575, a global bandwidth surplus is calculated for each class of service. At 580, a portion of a bandwidth share for a class of service with a global bandwidth surplus is transferred to a class of service with a global bandwidth deficit. The calculation of deficits and surplus, and reallocation of bandwidth may be performed substantially as described above in connection with the description of FIG. 4b. The portion of the surplus bandwidth may be transferred to a class of service with a largest global bandwidth deficit. Optionally, bandwidth may be transferred until the global bandwidth deficit is satisfied or until the global bandwidth surplus is exhausted. By dynamically reallocating traffic to meet bandwidth QoS guarantees a "dynamic fairness" for bandwidth is achieved for the various classes of service across the uplink group.

Although QoS traffic share optimization process logic 500 is referred to herein as "optimizing", the optimization may take many forms. For example, bandwidth may be reallocated and the entire bandwidth deficit for a class may not be entirely eliminated, even when a bandwidth surplus still remains after reallocation. The process logic 500 may take into account link costs, or use traffic/class statistics or other historical data in determining reallocation shares. In one example, regression to historical averages and time it takes to regress statistics may increase or decrease the amount of the "pie" that gets reallocated. Special classes of service may be considered during reallocation, e.g., movable VMs, High Availability (HA), control, or management classes. In addition, the various programmed QoS parameters themselves or QoS rules based decisions may be employed.

Figure 7:
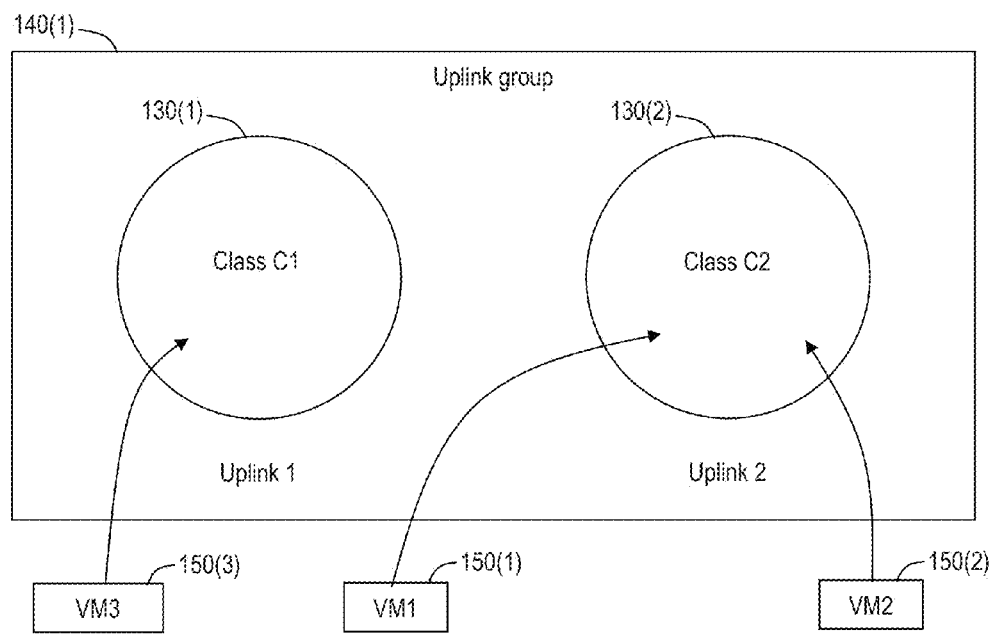
FIG. 7 is an example of a pie chart diagram depicting bandwidth reallocation for the uplink group of FIG. 4a by dynamically re-pinning a VM interface from one member of a first physical link to a member of a second physical link according to a second example.

Referring to FIG. 7, an alternative reallocation model will now be described according to a second example embodiment. In this example, uplink group 140(1) is shown. Process logic 500 has previously determined that uplink 130(1) was congested. In response, Process logic 500 reallocates all of class C1 to uplink 130(1) and all of class C2 to uplink 130(2), as shown. At the same time or nearly simultaneously, process logic 500 dynamically transfers traffic for VM 150(1) to uplink 130(2), e.g., by re-pinning the MAC address associated with VM 150(1) traffic. This process is formally described in connection with FIG. 8 as a continuation of the flowchart shown in FIG. 5.

Figure 8:
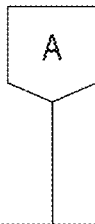
FIG. 8 is an example of a flowchart depicting a continuation of the process from FIG. 5 for reallocating traffic share according to the second example.

Referring to FIG. 8, at 585, bandwidth is reallocated by transferring a service flow associated with a class of service with a bandwidth deficit from one physical link to another physical link, e.g., from the congested link to a less congested link. Under normal circumstances re-pinning of a MAC address could lead to some packet loss as the connection is re-established over a new physical link, because some packets may not be fully processed through the receive and transmit buffers (e.g., buffers 240(1), 240(2), 250(1), and 250(2) shown in FIG. 2) that are associated with the physical uplinks and downlinks, or packets may still be in transit. However, the techniques described herein implement a double marker protocol to prevent packet loss.

Once it is known that a VM is going to be re-pinned to another uplink, e.g., VM 150(1) shown in FIG. 7, the network is notified and a first marker is transmitted from uplink 130(1) to 130(2) while outbound traffic for VM 150(1) is held or queued by uplink 130(1). When uplink 130(2) receives the marker, then it is known that all outbound traffic for VM 150(1) has been processed, e.g., through the transmit buffer. Uplink 130(2) sends a move message to uplink 130(1) that indicates that VM 150(1) may be moved to uplink 130(2) and inbound traffic for VM 150(1) is held or queued by uplink 130(2). When uplink 130(1) receives the move message, then it is known that all outbound traffic for VM 130(1) has been processed (the move message acts as a second marker) and the queued outbound traffic is passed from uplink 130(1) to uplink 130(2) for transmission. Re-pinning is completed and any inbound traffic that was queued by uplink 130(2) is passed to VM 150(1) or an associated application. The two markers form the double marker protocol.

In summary, the double marker protocol comprises sending a first marker message via a transmitter associated with the congested link to a receiver associated with the less congested link. Outbound traffic for the service flow at the congested link is queued. The first marker message is received at the receiver associated with the less congested link. In response to receiving the first marker message, inbound traffic for the service flow at the less congested link is queued and a second marker message is sent via a transmitter associated with the less congested link to a receiver associated with the congested link. The second marker message is configured to indicate a transfer of the service flow. The second marker message is received at the receiver associated with the congested link. In response to receiving the second marker message, the service flow is transferred and the queued outbound traffic is passed to the transmitter associated with the less congested link for transmission, and the queued inbound traffic is passed to an application associated with the service flow.

In addition, by using a double marker protocol the move boundaries or time between moves may be greatly shortened, thereby improving uplink group efficiency. For example, if the re-pinning mechanism operates once per hour, then the system can run out of balance for up to one hour. The techniques described herein may be used for re-pinning at a rate commensurate with speed of the double marker protocol without packet loss. However, the double marker protocol introduces some delay or latency due to packet queuing during the re-pinning process.

Figure 9A:
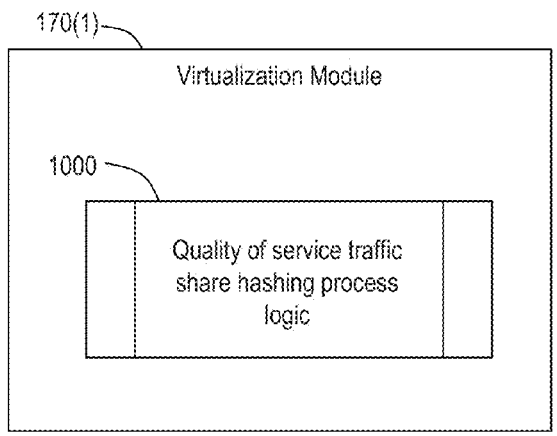
FIG. 9a is an example of a block diagram of the virtualization module from FIG. 2 that is configured to optimize traffic share among members by QoS hashing.

Turning now to FIG. 9a, the virtualization module 170(1) from FIG. 2 is shown. Virtualization module 170(1) may also be equipped with QoS traffic share hashing process logic 1000. Process logic 1000 may replace process logic 500, or operate in tandem with process logic 500 as part of the same process or software thread, or operate as a separate process or thread, e.g., as part of a real-time operating system (RTOS). Process logic 1000 may be stored as software or implemented in hardware in any similar manner as process logic 500 as described above. A simplified example of QoS hashing performed by process logic 1000 is described in connection with FIG. 9b and a flowchart for process logic 1000 is described in connection with FIG. 10.

Figure 9B:
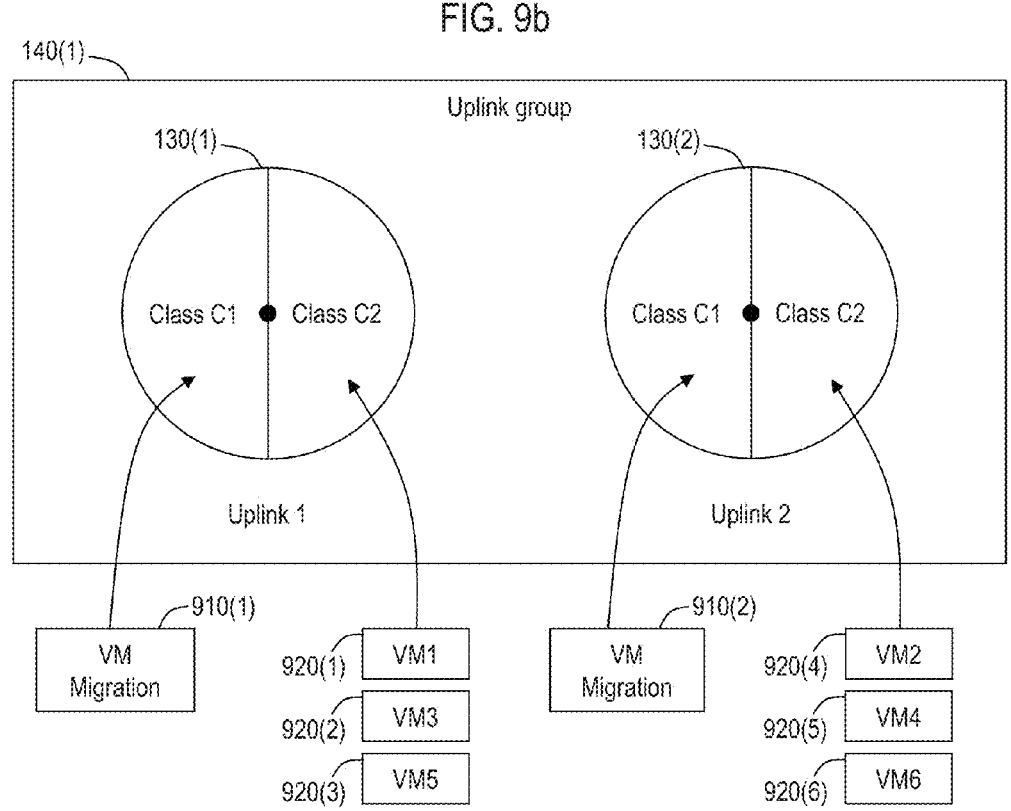
FIG. 9b is an example of a pie chart diagram depicting VM interface allocation among members of an uplink group by QoS hashing.

Referring to FIG. 9b, uplink group 140(1) is shown with classes C1 and C2 evenly allocated across uplinks 130(1) and 130(2). For purpose of description, it is presumed that VM migration bandwidth 910(1) is assigned to uplink 130(1) class C1, VM migration bandwidth 910(2) is assigned to uplink 130(2) class C1, none of the VMs 920(1)-920(6) are in operation, and VMs 920(1)-920(6) belong to class C2. As requests are received for VM interfaces, the requests are hashed according to QoS class C2, to which the VMs 920(1)-920(6) belong. The first VM interface request is for VM 920(1). Since it is a first request, process logic 1000 arbitrarily pins or assigns VM 920(1) to uplink 130(1). A second VM interface request is received, and since uplink 130(1) has class C2 traffic and uplink 130(2) has no class C2 traffic, process logic 1000 assigns VM 920(2) to uplink 130(2). Remaining requests are received and VMs 920(3)-920(6) are assigned in a balanced fashion, as shown. It is to be understood that this is a simplified example and that the VMs do not have to be allocated equally across the class C2 members of uplink group 140(2), e.g., other considerations may be in play, e.g., statistical methods as described above.

Figure 10:
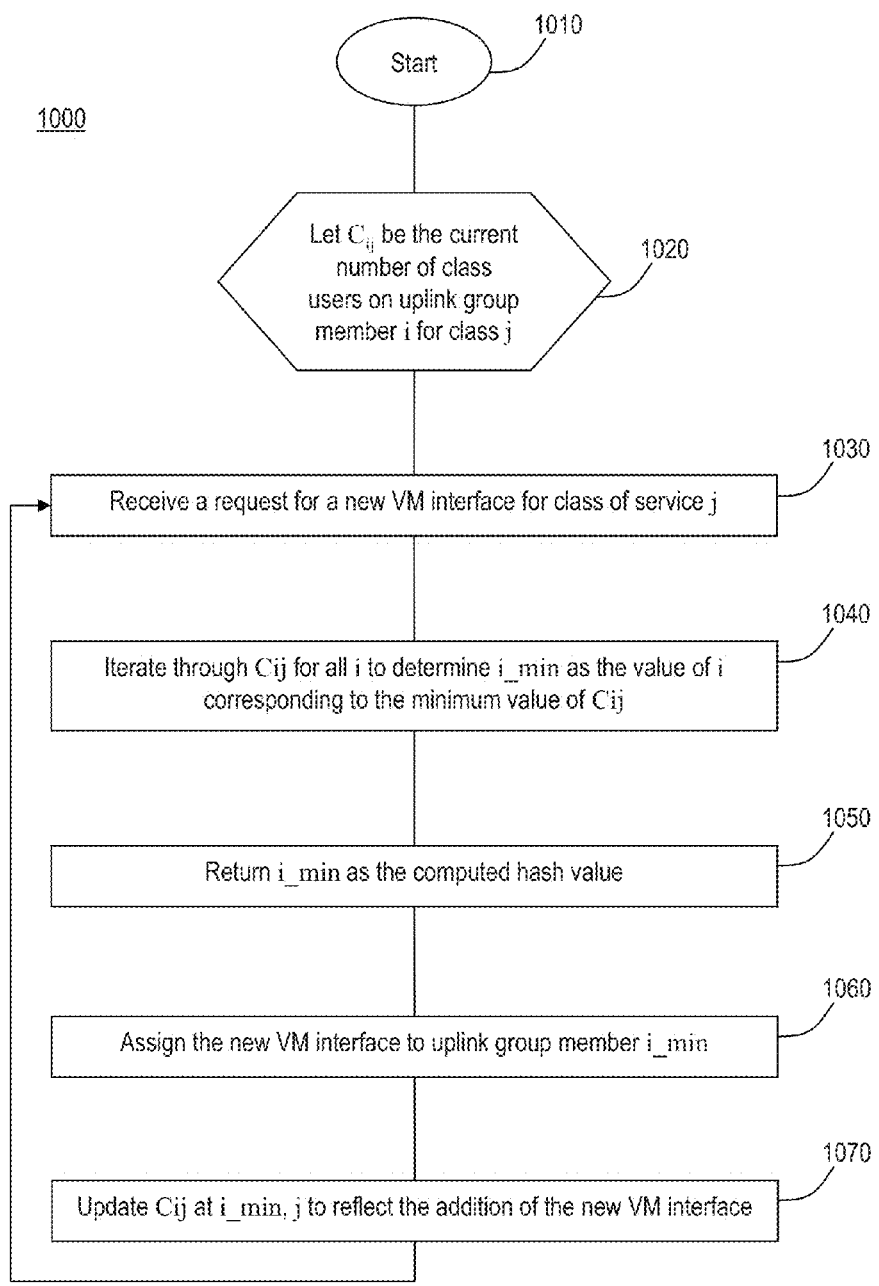
FIG. 10 is an example of a flowchart generally depicting a process for allocating VM interfaces among members of an uplink group by QoS hashing.

Turning to FIG. 10, a flowchart generally depicting process logic 1000 for allocating VM interfaces among members of an uplink group by QoS hashing will now be described. At 1010, the process begins. For each member of an uplink group comprising a plurality of physical links at a server apparatus, a current number of class of service users is tracked for each member of the uplink group by corresponding class. This is indicated at 1020 where variable or array $C_{ij}$ tracks the current number of class users on uplink group member i for class j. At 1030, a virtual machine (VM) interface request for a VM running on the server apparatus associated with a particular class of service, e.g., class j, is received.

Process logic 1000 determines which member of a corresponding class has the minimum number of class users for the particular class of service. This is indicated at 1040 by iterating through $C_{ij}$ for all i to determine i_min as the value of i corresponding to the minimum value of $C_{ij}$ for members i of class j. At 1050, i_min is returned as the computed QoS hash value. At 1060, the VM is assigned to the member with the minimum number of class users for class j. At 1070, $C_{ij}$ is updated to reflect the newly added VM. The process returns to 1030 upon receiving a new VM interface request. It should be understood that $C_{ij}$ is also updated when a VM migrates to another server, is shut down, or is otherwise removed from the uplink group.

Techniques are described herein for forming an uplink group comprising a plurality of physical links, e.g., at least first and second physical links. A first class of service is defined that allocates a first share of available bandwidth on the uplink group. A second class of service defined that allocates a second share of available bandwidth on the uplink group. The bandwidth for the first class of service is allocated across the plurality of physical links of the uplink group. The bandwidth for the second class of service is allocated across the plurality of physical links of the uplink group. Traffic rates are monitored on each of the plurality of physical links to determine if a physical link is congested indicating that a bandwidth deficit exists for a class of service. In response to determining that a physical link is congested, bandwidth is reallocated for a class of service to reduce the bandwidth deficit for a corresponding class of service when a bandwidth deficit exists for the corresponding class of service.

Techniques are also described herein for assigning new VMs to a member according to QoS hashing results. For each member of an uplink group, a current number of class users is tracked for each member of the uplink group by corresponding class. A virtual machine (VM) interface request for a VM associated with a particular class of service is received. A determination is made for which member of a corresponding class has the minimum number of class users for the particular class of service. The VM is assigned to the member with the minimum number of class users. Similar techniques may be employed on downlinks.

The techniques described herein help to ensure configured class QoS guarantees, allow the dynamic adaptation of bandwidth shares (which may be especially useful for traffic that does not hash well or traffic that comprises a single flow), avoid congestion by including QoS class in the VM interface assignment hash algorithm, and improve utilization by dynamically re-pinning VM service flows.

The above description is intended by way of example only.

What is claimed is:

1. A method comprising:
    at a network element having a plurality of physical links configured to communicate traffic over a network to or from the network element, forming an uplink group comprising the plurality of physical links that forward traffic associated with one or more classes of service, wherein the plurality of physical links comprise a first physical link and a second physical link;
    defining a plurality of classes of service comprising a first class of service and a second class of service, wherein the first class of service and second class of service have bandwidth allocations on the first physical link;
    receiving a virtual machine (VM) interface request for a new VM running on the network element, wherein the new VM is a class of service user associated with a first class of service but is not in operation;
    determining which physical link of the uplink group has a minimum number of class of service users associated with Virtual Machines (VMs) for the first class of service;
    associating a Media Access Control (MAC) address of a virtual machine that has a first class of service traffic to the first physical link from the uplink group with the minimum number of VMs for the first class of service in order to ensure that a number of VMs of each physical link of the uplink group are allocated evenly;
    detecting that traffic congestion on the first physical link exceeds a predetermined threshold for the first class of service;
    pausing outbound traffic associated with the MAC address of the virtual machine on the first physical link; and
    re-associating the MAC address of the virtual machine to the second physical link such that the traffic congestion falls below the predetermined threshold.

2. The method of claim 1, wherein pausing outbound traffic comprises:
    queuing the outbound traffic associated with the MAC address of the virtual machine on the first physical link; and
    transferring the queued outbound traffic to the second physical link.

3. The method of claim 1, further comprising re-associating MAC addresses of all virtual machines associated with the first class of service on the first physical link to the second physical link.

4. The method of claim 1, further comprising:
    upon detecting that traffic congestion exceeds a predetermined threshold, creating a queue of outbound traffic associated with the MAC address of the virtual machine on the first physical link;
    sending a first marker message from the first physical link to the second physical link which causes the second physical link to queue traffic for the MAC address of the virtual machine re-associated with the second physical link; and
    sending a second marker message from the second physical link to the first physical link which causes the transfer of the queue to the second physical link.

5. A method comprising:
    for each member of an uplink group comprising a plurality of physical links at a network element, tracking a current number of class of service users by corresponding class;
    at the network element, receiving a virtual machine (VM) interface request for a new VM running on the network element, wherein the new VM is a class of service user associated with a particular class of service but is not in operation;
    determining which member of the uplink group has the minimum number of class of service users associated with Virtual Machines (VMs) for the particular class of service; and
    associating the new VM with a first member of the uplink group with the minimum number of VMs for the particular class of service in order to ensure that the number of VMs of each member of the uplink group are allocated evenly.

6. The method of claim 5, wherein determining which member has the minimum number of VMs comprises using traffic statistics to determine the member of the uplink group with the lowest bandwidth utilization for the particular class of service.

7. The method of claim 5, further comprising:
detecting that traffic congestion on the first member of the uplink group exceeds a predetermined threshold for the particular class of service;
pausing outbound traffic associated with a Media Access Control (MAC) address of a VM on the first member of the uplink group; and
re-associating the MAC address of the VM to a second member of the uplink group such that the traffic congestion falls below the predetermined threshold.

8. An apparatus comprising:
a plurality of physical links including a first physical link and a second physical link;
a switch unit coupled to the plurality of physical links;
a processor coupled to the switch unit, and configured to:
form an uplink group comprising the plurality of physical links that forward traffic associated with one or more classes of service;
define a plurality of classes of service comprising a first class of service and a second class of service, wherein the first class of service and second class of service have bandwidth allocations on the first physical link;
receive a virtual machine (VM) interface request for a new VM running on the network element, wherein the new VM is a class of service user associated with a first class of service but is not in operation;
determine which physical link of the uplink group has a minimum number of Virtual Machines (VMs) for the first class of service;
associate a Media Access Control (MAC) address of a virtual machine that has a first class of service traffic to the first physical link from the uplink group with the minimum number of VMs for the first class of service in order to ensure that a number of VMs of each physical link of the uplink group are allocated evenly;
detect that traffic congestion on the first physical link exceeds a predetermined threshold for the first class of service;
pause outbound traffic associated with the MAC address of the virtual machine on the first physical link; and
re-associate the MAC address of the virtual machine to the second physical link such that the traffic congestion falls below the predetermined threshold.

9. The apparatus of claim 8, wherein the processor configured to pause outbound traffic by:
queuing the outbound traffic associated with the MAC address of the virtual machine on the first physical link; and
transferring the queued outbound traffic to the second physical link.

10. The apparatus of claim 8, wherein the processor configured to re-associate MAC addresses of all virtual machines associated with the first class of service on the first physical link to the second physical link.

11. The apparatus of claim 8, wherein the processor is further configured to:
upon detecting that traffic congestion exceeds a predetermined threshold, create a queue of outbound traffic associated with the MAC address of the virtual machine on the first physical link;
send a first marker message from the first physical link to the second physical link which causes the second physical link to queue traffic for the MAC address of the virtual machine re-associated with the second physical link; and
send a second marker message from the second physical link to the first physical link which causes the transfer of the queue to the second physical link.

12. An apparatus comprising:
a plurality of physical links;
a switch unit coupled to the plurality of physical links;
a processor coupled to the switch unit, and configured to:
for each member of an uplink group comprising the plurality of physical links at a network element, track a current number of class of service users by corresponding class;
receive a virtual machine (VM) interface request for a new VM running on the network element, wherein the new VM is a class of service user associated with a particular class of service but is not in operation;
determine which member of the uplink group has a minimum number of class of service users associated with Virtual Machines (VMs) for the particular class of service; and
associate the VM with a first member of the uplink group with the minimum number of VMs for the particular class of service in order to ensure that the number of VMs of each member of the uplink group are allocated evenly.

13. The apparatus of claim 12, wherein the processor is configured to determine which member has the minimum number of VMs based on traffic statistics to determine the member of the uplink group with the lowest bandwidth utilization for the particular class of service.

14. The apparatus of claim 12, wherein the processor is further configured to:
detect that traffic congestion on the first member of the uplink group exceeds a predetermined threshold for the particular class of service;
pause outbound traffic associated with a Media Access Control (MAC) address of a VM on the first member of the uplink group; and
re-associate the MAC address of the VM to a second member of the uplink group such that the traffic congestion falls below the predetermined threshold.

15. A non-transitory computer readable storage media encoded with software comprising computer executable instructions and when the software is executed operable to:
at a network element having a plurality of physical links configured to communicate traffic over a network to or from the network element, form an uplink group comprising the plurality of physical links that forward traffic associated with one or more classes of service, wherein the plurality of physical links comprise a first physical link and a second physical link;
at the network element, receive a virtual machine (VM) interface request for a new VM running on the network element, wherein the new VM is a class of service user associated with a first class of service but is not in operation;

determine which physical link of the uplink group has a minimum number of class of service users associated with Virtual Machines (VMs) for the first class of service;

associate the VM with a first physical link from the uplink group with the minimum number of VMs for the first class of service in order to ensure that the number of VMs of each physical link of the uplink group are allocated evenly;

detect that traffic congestion on the first physical link exceeds a predetermined threshold for the first class of service;

pause outbound traffic associated with a Media Access Control (MAC) address of a VM on the first physical link; and re-associate the MAC address of the VM to the second physical link such that the traffic congestion falls below the predetermined threshold.

16. The non-transitory computer readable storage media of claim 15, wherein the instructions operable to pause outbound traffic is are further operable to:
queue the outbound traffic associated with the MAC address of the VM on the first physical link; and
transfer the queued outbound traffic to the second physical link.

17. The non-transitory computer readable storage media of claim 15, wherein the instructions operable to re-associate the MAC address of the VM are further operable to transfer traffic from all virtual machines associated with the first class of service on the first physical link to the second physical link.

18. The non-transitory computer readable storage media of claim 15, further comprising instructions operable to:
upon detecting that traffic congestion exceeds a predetermined threshold, create a queue of outbound traffic associated with the MAC address of the VM on the first physical link;
send a first marker message from the first physical link to the second physical link which causes the second physical link to queue traffic for the MAC address of the VM re-associated with the second physical link; and
send a second marker message from the second physical link to the first physical link which causes the transfer of the queue to the second physical link.

19. The non-transitory computer readable storage media of claim 15, wherein the instructions operable to determine which physical link has the minimum number of VMs are further operable to use traffic statistics to determine the physical link of the uplink group with the lowest bandwidth utilization for the first class of service.

20. The non-transitory computer readable storage media of claim 15, further comprising instructions operable to:
pause outbound traffic associated with MAC addresses of all VMs on the first physical link of the uplink group; and
re-associate MAC addresses of all VMs to a second physical link of the uplink group such that the traffic congestion falls below the predetermined threshold.

* * * * *